(12) United States Patent
Lazzer

(10) Patent No.: US 6,657,168 B1
(45) Date of Patent: Dec. 2, 2003

(54) TOASTER

(75) Inventor: Jean-Pierre Lazzer, Montchanin (FR)

(73) Assignee: Hameur S.A., Luxembourg (FR)

(*) Notice: Subject to any disclaimer, the term of this patent is extended or adjusted under 35 U.S.C. 154(b) by 0 days.

(21) Appl. No.: 10/110,516

(22) PCT Filed: Oct. 16, 2000

(86) PCT No.: PCT/FR00/02881

§ 371 (c)(1),
(2), (4) Date: Sep. 23, 2002

(87) PCT Pub. No.: WO01/26523

PCT Pub. Date: Apr. 19, 2001

(30) Foreign Application Priority Data

Oct. 14, 1999 (FR) .............................. 99 12807

(51) Int. Cl.[7] .............................. A47J 37/08
(52) U.S. Cl. ................ 219/405; 219/386; 392/423; 99/327
(58) Field of Search ................. 219/385, 386, 219/405, 411; 99/325–327, 447, 389, 400; 392/422–425, 418

(56) References Cited

U.S. PATENT DOCUMENTS 5,960,702 A * 10/1999 Thiriat et al. ............... 99/327

FOREIGN PATENT DOCUMENTS

| DE | 90 15 300 | 3/1991 |
| DE | 196 52 270 | 3/1998 |
| FR | 2 050 772 | 4/1971 |
| FR | 2 763 233 | 11/1998 |
| GB | 2083344 | * 3/1982 |

* cited by examiner

Primary Examiner—Joseph Pelham
(74) Attorney, Agent, or Firm—Duane Morris LLP

(57) ABSTRACT

This toaster consists of a casing (1) that is essentially parallelepiped in shape and thermally insulated, and at least one electrical resistor (6) which constitutes a radiant heating element and is enclosed in the casing. The side walls (3, 4) of the casing (1) are transparent.

9 Claims, 5 Drawing Sheets

TOASTER

Figure 1:
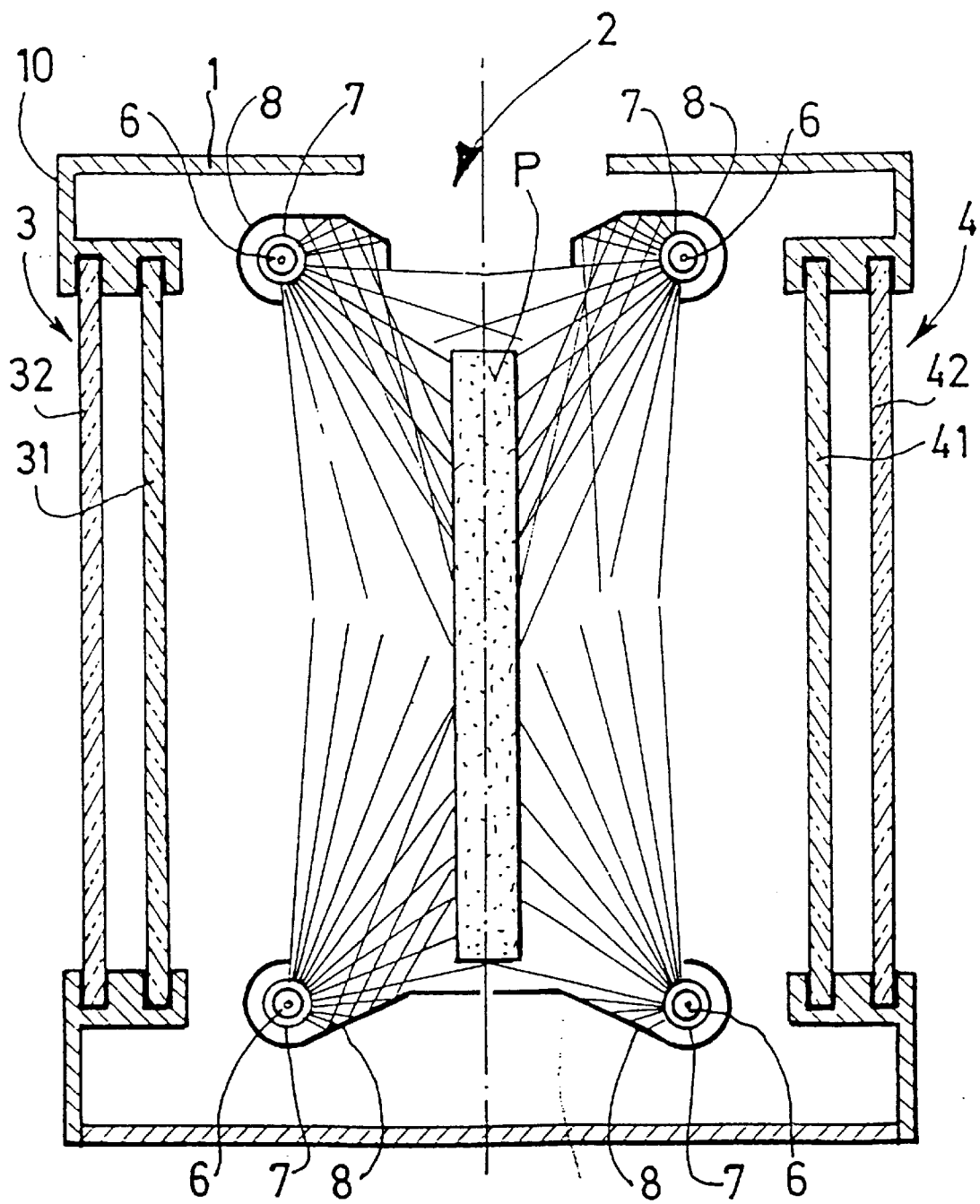

The present invention is a toaster.

Most households are equipped with such an appliance. In the toasters known at present, one or more resistors, connected to a source of electrical current, usually the local supply circuit, face a chamber into which bread to be toasted is inserted. After a determined period of time, the heat cuts off and the toasted bread is taken out or is ejected from the appliance. In the most sophisticated apparatus, practice is to enclose the resistor(s) in quartz tubes to avoid the user=s coming in contact with an exposed conductor.

For safety reasons, the resistors are placed in an insulated casing which prevents users from burning themselves on contact with the appliance.

Unfortunately, these casings are opaque, which makes it difficult to see the state of the bread inside the appliance. For this reason, most toasters are equipped with a more or less sophisticated timer that automatically cuts off the electrical supply at the end of a determined time, which can be regulated.

The bread is toasted after a relatively slow rise in temperature, in a few seconds, after which it burns. Also, the toasting time varies with the physical qualities of the bread, such as the degree to which it is baked.

Thus, the purpose of the present invention is to solve the problems mentioned and to allow for visual monitoring of the toasting process, stopping it when the desired degree of toasting is reached.

The subject is thus a toaster, comprising a casing that is essentially parallelepiped in shape and heat insulated, and at least one electrical resistor which constitutes a radiant heating element enclosed in the casing, characterized in that the side walls of the casing are transparent.

It is thus possible to control the toasting and to stop it at the desired moment, depending on the user's preference.

According to another characteristic of the invention, on each side of the casing, two heating elements are located at the top and bottom of the casing, respectively above and below the transparent plates that form the side walls of the casing, the heating elements being enclosed in reflective housings.

When the resistor is connected to the electrical supply, the bread is subjected to uniform radiation, mainly infrared, the major part of the emission spectrum being in this wavelength band.

According to another characteristic of the invention, the resistors are surrounded by reflectors of a curved sector of approximately 270E and the lower reflectors are mounted at a moveable angle with regard to the resistors, with means to control their movement between an off position, when they are turned downwards to form a protective guard, and an in-operation position, when they are turned towards a chamber holding the bread to be toasted.

These means of control consist of a cam mechanism comprising two small rods each mounted so that they can oscillate on the casing and each having one end with a hole in which there is a pin connected with a corresponding reflector, and a second end that moves jointly with a bread carrier.

This avoids having crumbs affecting the effectiveness of the reflectors and resistors when bread is inserted or taken out of the casing.

According to another characteristic of the invention, the side walls are made of double transparent, insulated glazing. They can also be made of non-shattering glass.

The inner surface of the glass plate(s) is preferably coated with a layer of metallic oxide that reflects the infrared rays. This layer may be colored so that the bread, irradiated by the infrared (which does not present optical problems) and partly by the red of the resistor, presents the color of ambient light. This problem can also be dealt with by including a filter on the transparent walls.

Figure 2:
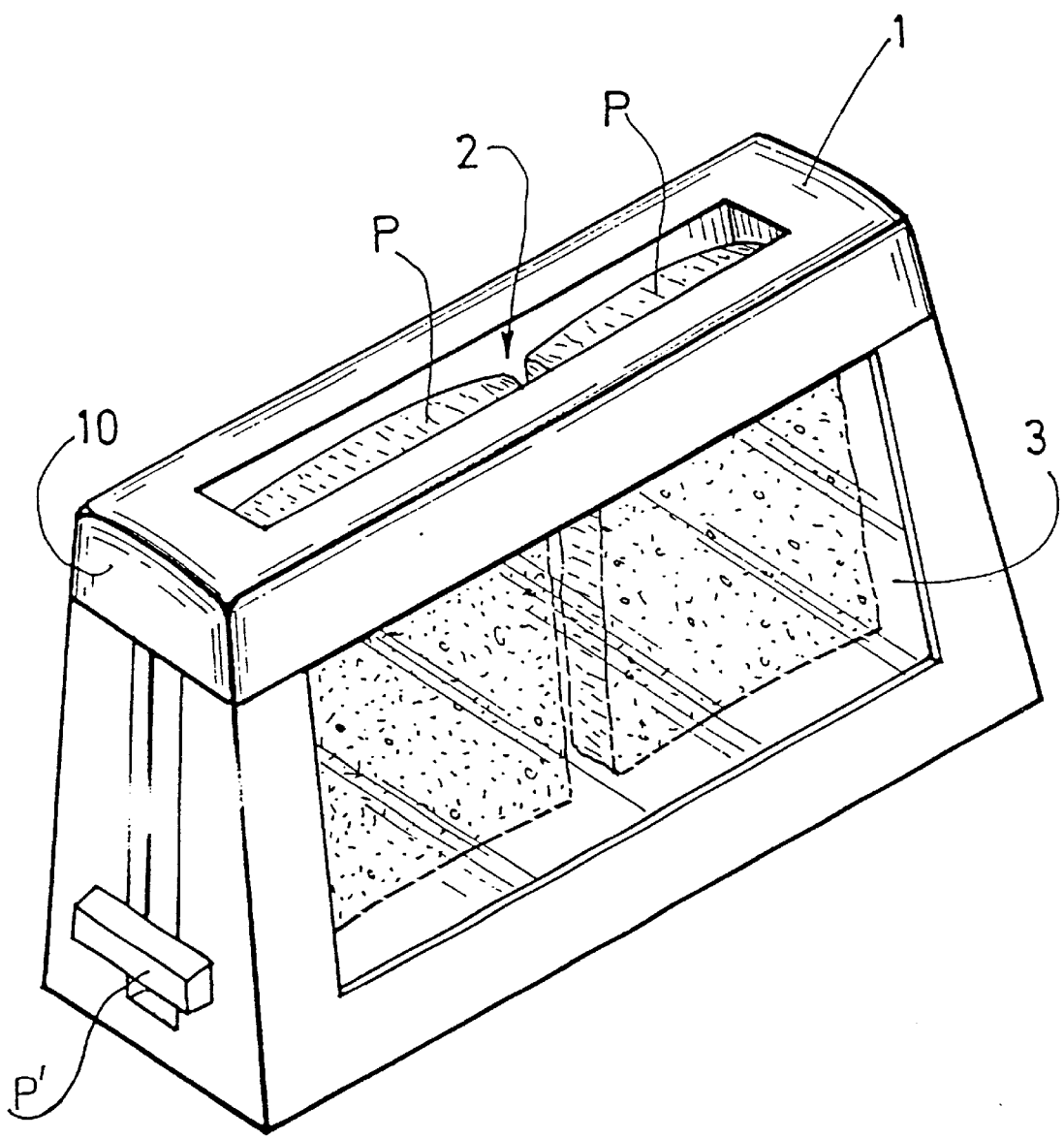
Figure 3:
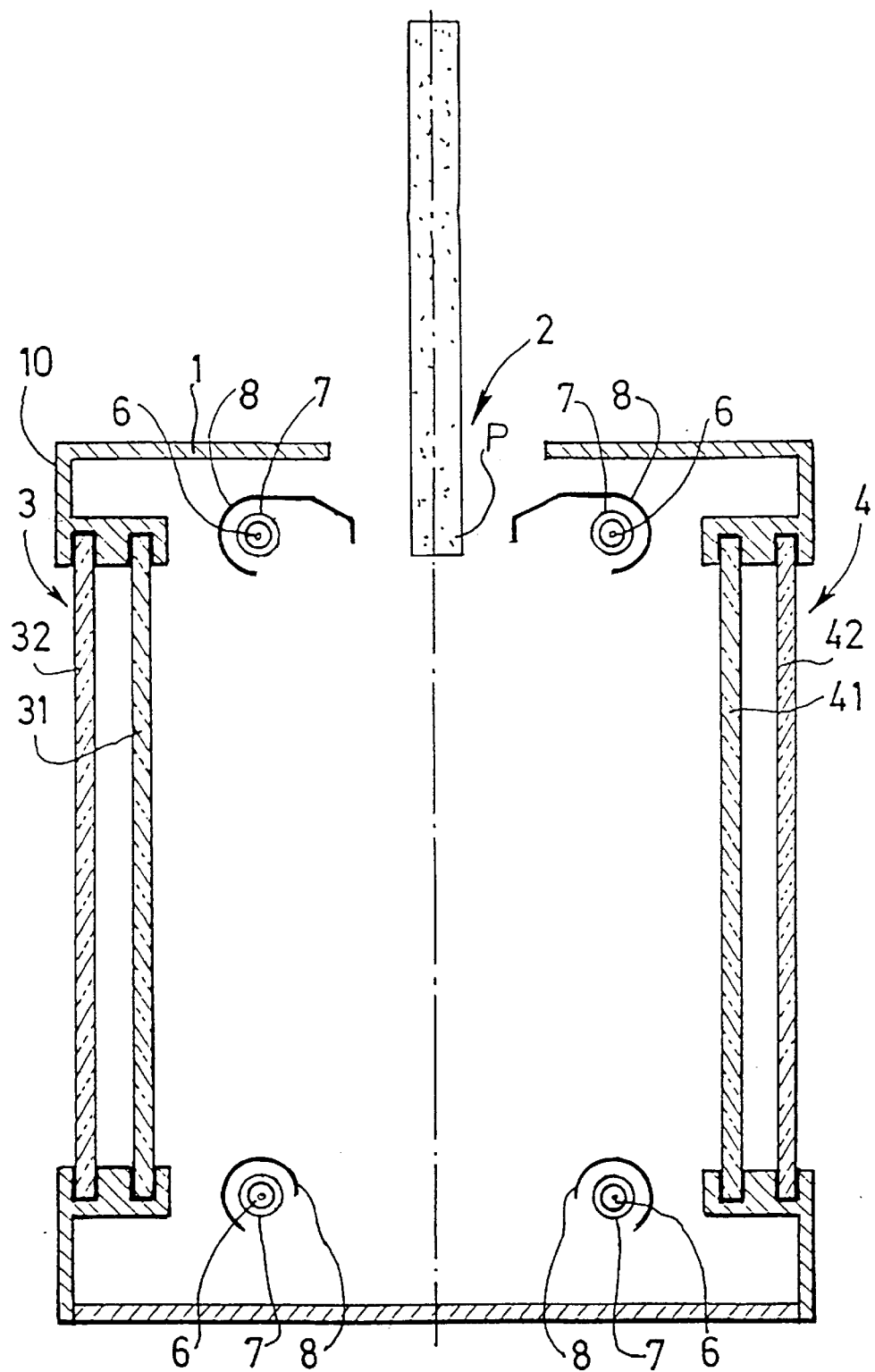
Figure 4:
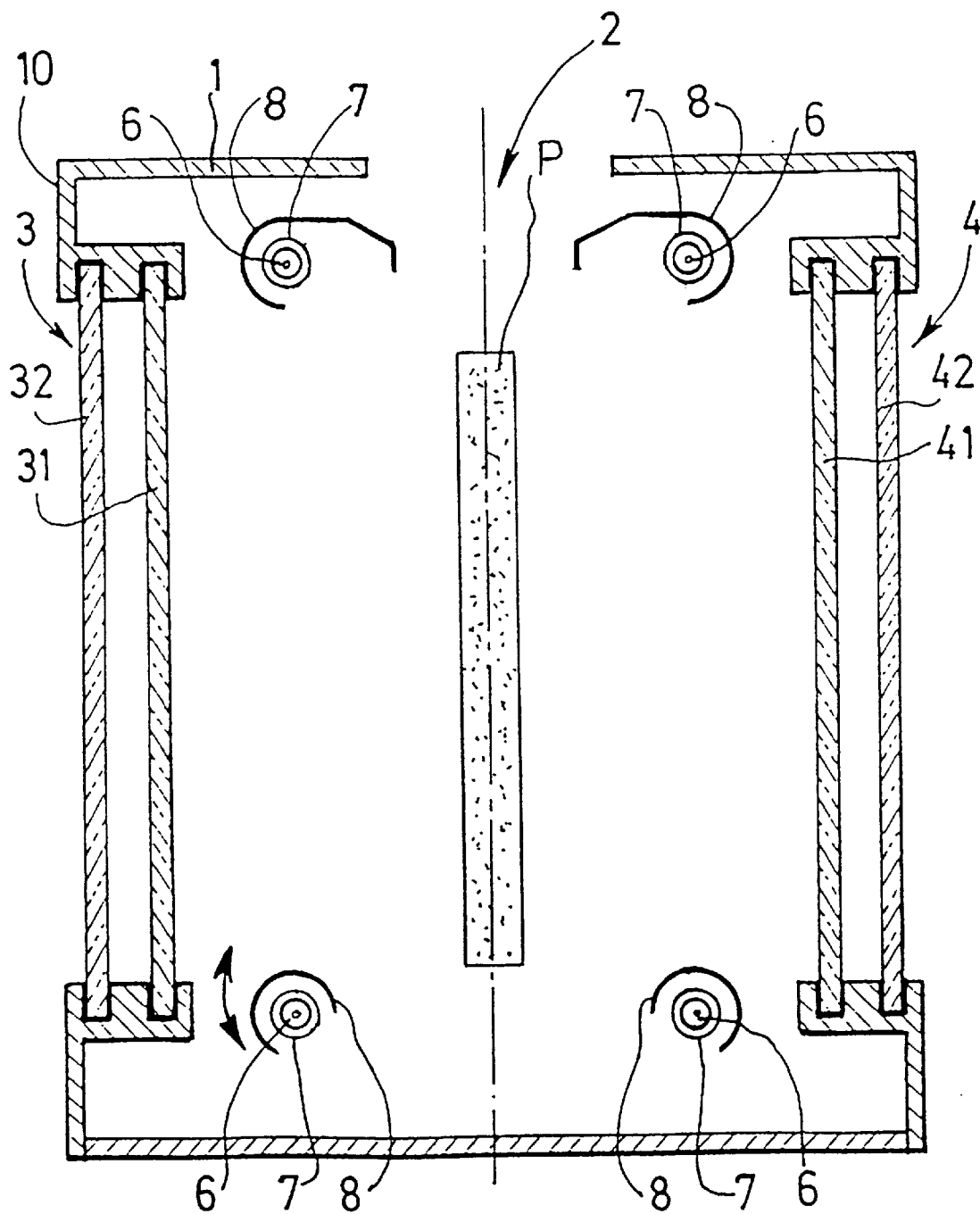
Figure 5:
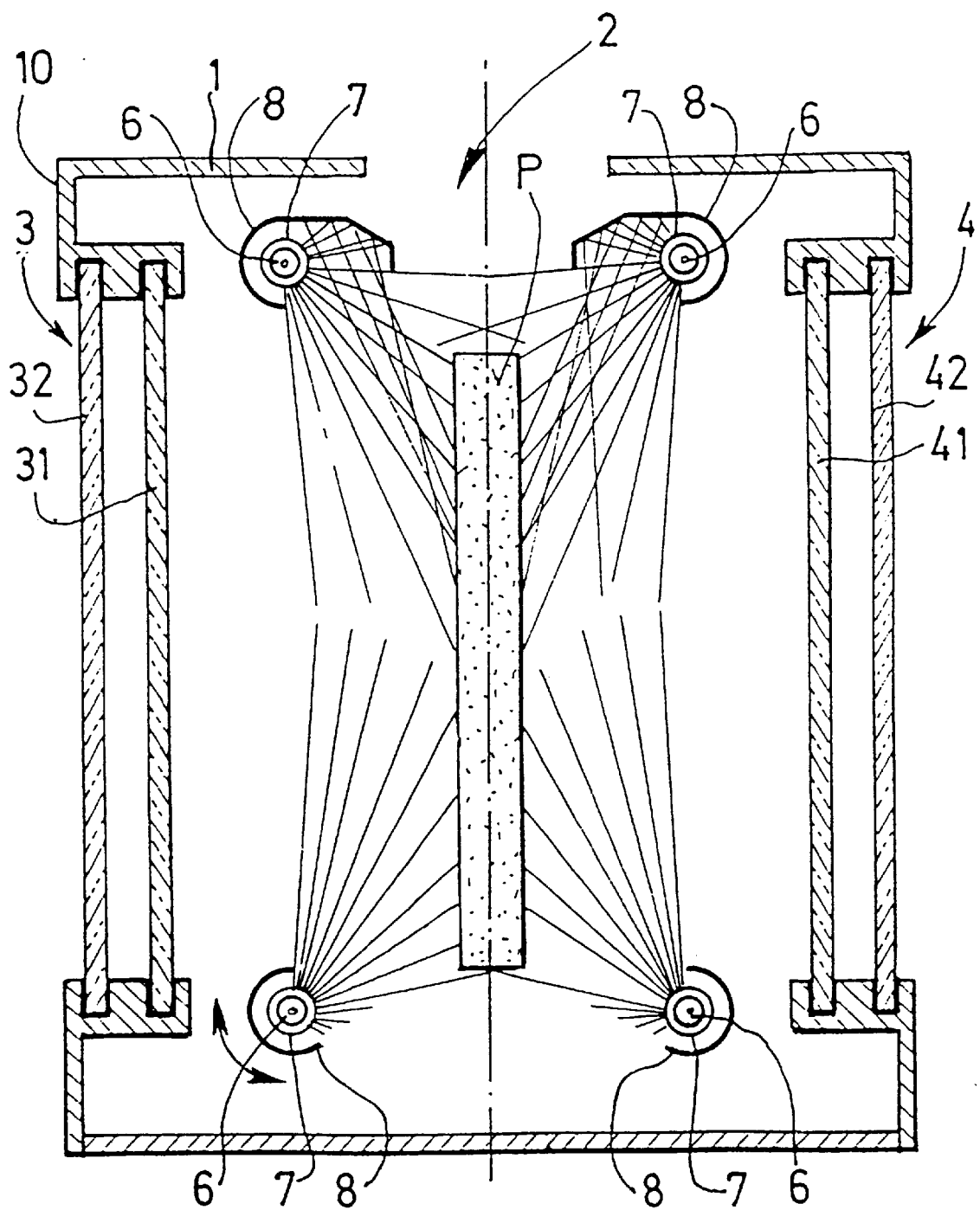

Other characteristics and advantages of the invention will become evident in the course of the following description of particular methods of producing the toaster, provided solely as a non-limiting example and with reference to the attached figures in which:

FIG. 1 gives a schematic cross section of a toaster according to the invention;

FIG. 2 is a schematic representation of the same apparatus in perspective;

FIG. 3 schematically illustrates another example of how the toaster can be made according to the invention, as bread is being inserted;

FIG. 4 shows the toaster in the figure after the bread is put in and before the resistors are switched on; and FIG. 5 shows the toaster of FIGS. 3 and 4 while toasting.

In FIGS. 1 and 2, we see that the toaster is made up of a casing of an essentially parallelepiped shape, in metal, for example, with a slot 2 on top through which one (or more) slices of bread P may be introduced. This slice is supported in mid position in relation to the walls 3 and 4 by recognized methods (not shown). The lower part of the casing may be sliding to form what is known as a crumb catcher.

According to the invention, the side walls of the casing, that is the longitudinal walls, are made up of plates of glass, 31, 32 and 41, 42 respectively. The plates 32, 42 constitute the outer sides and the plates 31 and 41 the inner sides. In the example shown, the plates are mounted in the edges 31, 41 of the casing 1 and, according to another characteristic of the invention, they are mounted so that they slide longitudinally in two parallel grooves on the apparatus.

According to another characteristic of the invention, the plates 31, 32, 41,42 can slide or be held in the grooves of the casing edges and are thus removable to facilitate cleaning.

Between the two plates forming the walls 3 and 4 are spaces 5 which are normally air filled to ensures thermal insulation between the outside and inside of the casing.

With regard to the heating elements, it is possible to use a single resistor on each side surrounded by a reflector, this resistor being mounted midway on each side, thus not markedly affecting vision, but preferably, one would have two resistors on each side mounted outside the field of vision.

An advantage is that the heating resistors 6 are enclosed in quartz tubes 7 which improve infrared emission.

According to a characteristic of the invention, they are located at the four corners of the casing, above and below the side plates 3 and 4, thus leaving free the field of vision through the side walls.

As can be seen in FIG. 1, the toaster preferably has four resistors arranged next to the inner sides of the longitudinal walls of the casing, that is, two upper resistors and two lower resistors, respectively located next to the upper and lower ends of the plates 3 and 4.

In order for the bread to be almost uniformly bombarded with infrared rays that heat the bread radiantly, around each quartz tube 7 is a reflector 8 which directs the rays emitted at an angle of almost 90E so that both sides of the bread receive uniform energy, since the reflectors 8 surround the quartz tubes 7 in an approximately 270E sector. In the lower part of the casing, the reflectors 8 also conceal the heating elements so they are not apparent from outside the casing.

The cover 10 of the casing 1 is, in the example shown, removable to allow access to the plates to take them out. A switch (not illustrated) allows for the electrical feed to the resistors 6 to be instantly cut off so that their temperature drops rapidly. Of course, known means allow for ejection of the bread as soon as the current is cut off.

The design is such that the toaster that has just been described, which is provided with longitudinal walls made up of transparent plates and electrical resistors offset from them, each with a reflector, can provide for control of the bread=s toasting, allowing for uniform toasting.

Note however that the invention just described is not limited to the method proposed.

We will now describe, with reference to FIGS. 3 to 5, another method.

On these figures, elements identical to FIGS. 1 and 2 have the same reference numbers.

As in the example previously described, the toaster has a casing 1 with longitudinal sides equipped with transparent plates 31,32, 41, 42 allowing a user to monitor the toasting, and a slot 2 for inserting bread which leads into a corresponding chamber to receive the bread.

As is customary, this chamber is provided with a bread carrier (not illustrated) that can be moved from top to bottom by means of a lever handle P that is manually activated by the user to insert the bread to be toasted. For example, a spring raises the carrier to the up position so that it is automatically returned to this position when toasting is complete.

Also, the toaster is provided with electrical heating resistors 6 placed in a quartz tubes 7 and located inside next to the upper and lower ends of the transparent plates 31, 32, 41, and 42.

That is, the toaster is provided with two upper and two lower resistors.

Each resistor 6 has a concave reflector 8 designed to direct the infrared rays emitted by the resistors 6 to the bread P to be toasted.

Contrary to the method previously described with reference to FIGS. 1 and 2, the lower reflectors 8, which have the general form of a section of a cylinder, are mounted at an angle that is movable in relation to the resistors 6 between an angled position, seen on FIGS. 3 and 4, in which they take a position with their concave side turned downwards so as to constitute a protective cover thus preventing crumbs from falling on the quartz tubes 7 or on the active surface of the reflectors when bread is inserted or removed from the toaster, and an in-operation position, seen in FIG. 5, in which the concave side of the lower reflectors is turned towards the chamber where bread P to be toasted is inserted.

More precisely, the lower reflectors are mounted at a movable angle between the in-operation and off positions and are controlled by appropriate means of control so that the lower reflectors are in their off position when the bread P is inserted or taken out, and in their in-operation position while the bread is toasting.

Preferably, these means of control are in the form of a cam mechanism connected with the bread carrier equipping the chamber for receiving the bread P so as to transfer the rectilinear movement of the carrier into a rotational movement to cause the lower reflectors to move.

For example, the cam mechanism consists of two small rods each ensuring control of the angular movement of one of the reflectors and each is mounted in an oscillating fashion on the casing. These small rods each have one end with a hole in which there is a pin connected with a corresponding reflector and a second end connected to the lever P, which is fixed to the bread carrier.

Thus, according to this arrangement, the path of the carrier, when a slice of bread is inserted, has a first part during which the bread is moved in the casing, and a second part during which the reflectors are activated to move them into their in-operation position.

Contrarily, when the bread is ejected after toasting, the movement of the carrier has a first part during which the reflectors are placed in the off position and a second part during which the bread is ejected.

Of course, numerous variations may be made, in particular by substituting equivalent technical methods, without going outside the context of the invention.

Thus, for example, the resistors and lower reflectors can be protected with specific covers, movable by a means of control connected to the carrier so that they cover these resistors and reflectors when bread is inserted or ejected, the latter being fixed in this case.

What is claimed is:

1. Toaster comprising a casing (1) that is thermally insulated, essentially parallelepiped in shape and a bread carrier to receive the bread to be toasted, at least four resistors (6), constituting radiant heating elements, enclosed in the casing, two heating elements (6) located at the top and bottom of each side wall (3, 4) of the casing, the side walls of the casing (3, 4) being at least partially transparent, the heating elements (6) being enclosed in reflective housings (8) surrounding them in a sector of approximately 270°, characterized in that they form a means of protecting the lower resistors from read crumbs, the reflective housings comprising a part at least semi-cylindrical opening towards the center of the toaster.

2. Toaster according to claim 1 characterized in that the lower reflectors (8) are at least in part pivotally mounted with respect to the resistors (6) and controlled by means of a control to move them from an off position, in which their opening is turned downwards to constitute a protective cover and an in-operation position in which their opening is turned towards the carrier for the bread to be toasted.

3. Toaster according to claim 2, characterized in that the said means of control consists of a cam mechanism composed of two small rods each mounted in oscillating fashion on the casing and each with one end with a hole in which there is a pin connected to a corresponding reflector and another end that moves jointly with the bread carrier.

4. Toaster according to claim 1, characterized in that each side wall is made of double insulated glazing (31, 32, 41, 42).

5. Toaster according to claim 1 characterized in that the side walls are made of non-shattering glass.

6. Toaster according to claim 4 characterized in that the inner surface of the walls is coated with a layer of infrared reflecting material.

7. Toaster according to claim 6, characterized in that the layer of infrared reflecting material is colored.

8. Toaster according to claim 1, characterized in that the plates (31, 41, 32, 42) of the side walls (3,4) are mounted so that they are movable in at least one groove on the casing (1).

9. Toaster according to claim 5 characterized in that the inner surface of the walls is coated with a layer of infrared reflecting material.

* * * * *